Sept. 8, 1931.  L. E. WILLIAMS  1,822,684
GRAVITY DUMP VEHICLE
Filed April 27, 1927   2 Sheets-Sheet 1

Inventor
Leroy E. Williams.
by Burton & Burton
his Attorneys

Witness
J. F. McKnight

Sept. 8, 1931.  L. E. WILLIAMS  1,822,684
GRAVITY DUMP VEHICLE
Filed April 27, 1927    2 Sheets-Sheet 2
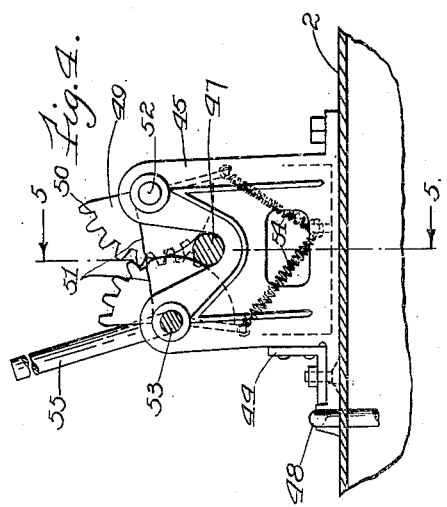
Inventor.
Leroy E. Williams.
by Burton & Burton
his Attorneys.

Patented Sept. 8, 1931

1,822,684

UNITED STATES PATENT OFFICE

LEROY E. WILLIAMS, OF EDGERTON, WISCONSIN, ASSIGNOR TO HIGHWAY TRAILER COMPANY, OF EDGERTON, WISCONSIN, A CORPORATION OF WISCONSIN

GRAVITY DUMP VEHICLE

Application filed April 27, 1927. Serial No. 186,836.

This invention relates to dump body vehicles, and more particularly to the gravity dump type which discharges a load in a rearward direction. The purpose of this invention is to provide an improved dumping action so that a loaded body may be tilted in a smooth and easy manner. It consists in certain features and elements of construction in combination, as herein shown and described, and as indicated by the claims.

In the drawings:—

Figure 3 is a rear end elevation of the vehicle as shown in Figure 1.

Figure 4 is a detail vertical section on an enlarged scale showing the locking mechanism.

Figure 5 is a transverse vertical section taken substantially as indicated at line 5—5 on Figure 4.

Figure 1:
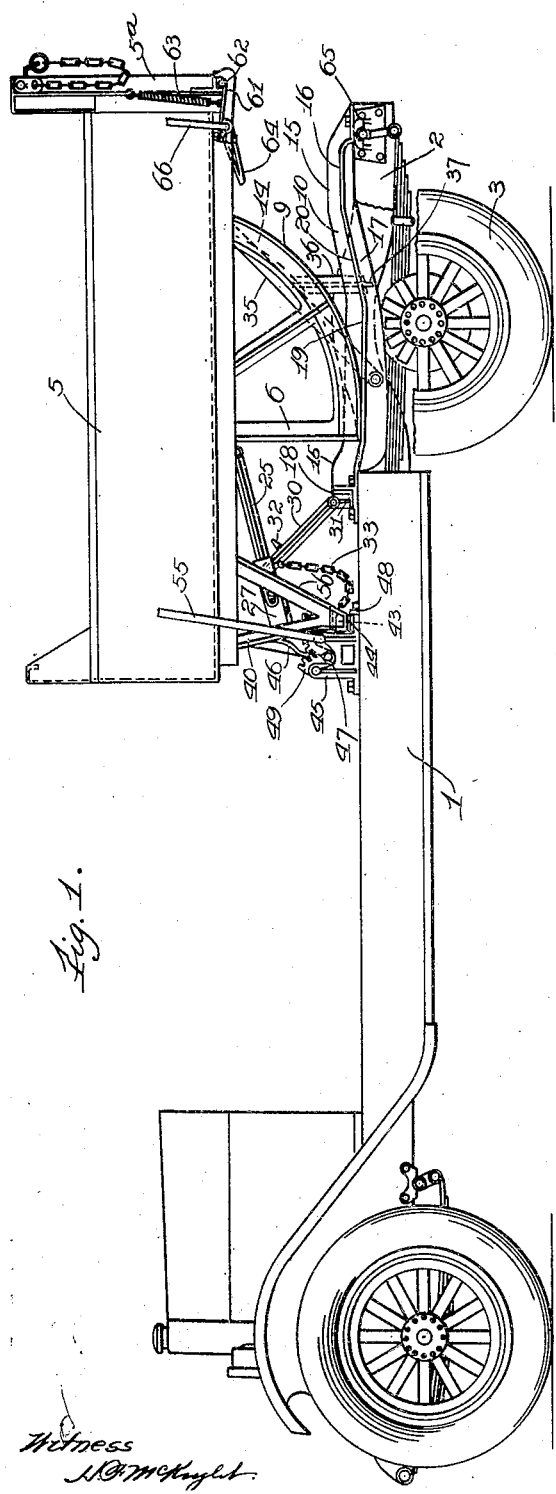
Figure 1 is a side elevation of the vehicle embodying this invention, with the body in a loading position.

Referring to the drawings, a motor truck chassis is indicated generally at 1, provided with a pair of longitudinally extending side members, 2, projecting beyond the rear wheels, 3. Said side members being of the usual channel construction are suitably cross-braced together and have their rear ends connected by a tie member, 4. Said side members are connected to and provided with the usual appurtenances of a motor truck chassis, which form no part of the present invention. A dump body, 5, of the usual construction, preferably of plate and angle members, is adapted to be rolled rearwardly on the chassis by gravity for discharging its load. Said body is provided with a tail gate, 5ª, hingedly connected at its upper end to the sides. The body is carried on a pair of transversely spaced cast rocker members, 6, secured to the underside of the body; the upper ends of said members also being attached to a pair of transversely extending angle irons, 7 and 8, respectively, also secured to the underside of the body. The rockers are provided with curved rolling faces, 9, adapted to roll on longitudinally disposed guide members, 10, preferably of cast metal construction, and which are secured at their rear ends on the top of the chassis rear cross member, 4; the forward ends of the guide members are secured to the upper side of a cross brace, 11, of channel construction. Said channel brace is disposed with its flanges depending downwardly and is suitably supported by a plate member, 12, abutting the ends of the flanges and connected to the chassis side members, 2, by U-bolts, 13, thereby providing a rigid support.

The curved rolling faces, 9, of the rockers, 6, are provided with continuous V-shaped grooves, 14, at the middle, adapted to register on corresponding inverted V-shaped guide ribs, 15, integral with and extending upwardly and longitudinally at the middle of each guide member, 10. The guide rib, 15, will positively maintain the rolling faces, 9, of the rocker members, 6, in alignment on the tracks, 16, formed on opposite sides of said ribs. Further, the guide ribs, 15, interposed in the V-grooves of the rolling faces, 9, of the rockers, will permit the body to be rolled rearwardly for dumping, in true alignment, and will prevent lateral body sway at all times. The under sides of the guide members, 10, have integrally formed reinforcing ribs, 17, extending longitudinally. The forward ends of said guide members are formed to provide a seat for supporting a transversely extending angle iron, 18, which is suitably attached thereto.

It will be noted that the rocker members are attached to the under side of the body, so that the point at which the rockers normally support said body when the same is in horizontal position, is slightly forward of the center of gravity of the body. This produces a tendency of the body to tilt rearwardly under the influence of gravity.

The guide members, 10, are provided with depressed portions, 19, sloping slightly downward in a rearward direction and inclining at 20 in an upwardly direction toward the rear of the vehicle. These depressions of the guide members, 10, allow the rocker members, 6, to have their curved rolling faces formed with a relatively large radius of curvature, thereby permitting the body to be mounted on the truck chassis a considerable distance farther forward than would otherwise be possible. Further, due to the large radius of the rolling faces of the rockers, the body will be carried farther back during the dumping action. It will be apparent from the drawings that the downward sloping portions, 19, of the track, 16, assist in initiating the dumping movement of the body, while the upward sloping portions, 20, serve to retard the speed of the rearward rocking movement of the body, and acts as a snubber to check the impact or shock usually incident to quick dumping actions. Obviously, this arrangement will eliminate the usual jarring and shocking of the truck chassis normally resulting when the body arrives at the limit of the dumping movement.

Figure 2:
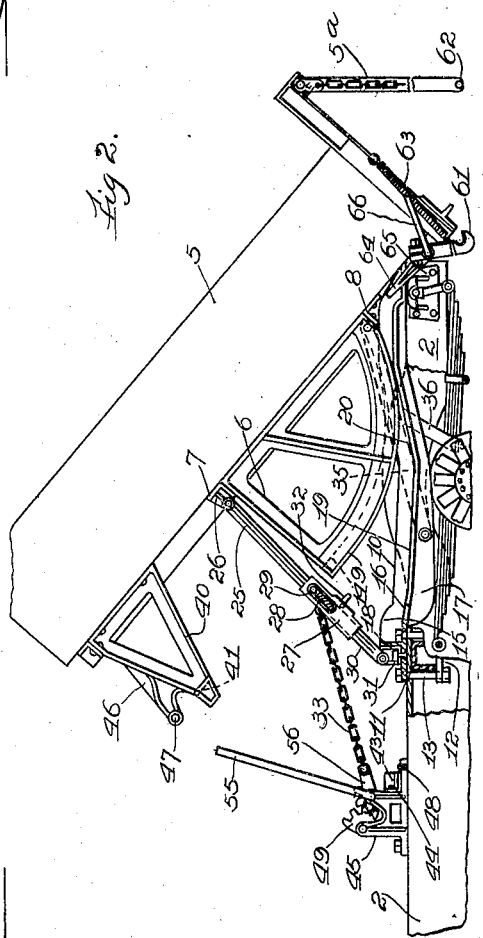
Figure 2 is a side elevation of the rear end of the vehicle, portions being broken away to show the body and operating mechanism, with the body in a gravity tilted or discharging position.

The impact of dumping is further cushioned by shock-absorbing mechanism connected to the under side of the body, on the longitudinal center of the vehicle, forwardly of the rocker members, 6. This mechanism comprises a link member, 25, the upper end thereof being bifurcated and pivotally connected to a bracket, 26, secured in mid-position on the transverse angle iron, 7; the lower end of said member terminating into a pair of parallelly spaced spring chambers, 27, having coil springs, 28, disposed therein. Spring plugs, 29, adapted to engage the springs for compressing them provide bearings for the pivot ends of the lower link member, 30. This lower link member, 30, is also bifurcated at its lower end and pivotally connected to a supporting bracket, 31, secured to the middle of the angle iron, 18, carried by the guide members, 10. The bifurcated ends of said link members, prevent said members from tilting laterally during operation. It will now be clear that as the body is rolled rearwardly to discharge its load, the link members are so arranged that the compression of the springs, 28, starts to take place before the body reaches its extreme dumping position, thereby cushioning the impact as the body gradually arrives at this limit. When the body is in tilted position as in Figure 2, the link members are in a substantially straight-line position, and it is desirable to prevent these members from buckling rearwardly, therefore, a double flanged head, 32, is formed on the upper side of the lower link, 30, for engaging the spring chambers as they pass on opposite sides of said link member, 30, thus limiting their forward movement. A chain, 33, is attached to the lower link member, 30, adjacent its upper end, and is adapted to be pulled by an operating handle hereinafter described, for buckling said link members forwardly, thereby starting the body to roll forward on the chassis to its normal position. It is also clear that as the body completes its forward movement its speed is again checked by the springs, 28, of the link member, as these springs are placed partially under compression, with the folding of the links 25 and 30 at their pivotal connection.

A pair of radius rods, 35, interconnect the guide members, 10, with the body, and normally extend obliquely upward except when dumping. The lower ends of said rods are pivotally connected to the reinforcing ribs, 17, inside of said guides and rockers; the upper ends of said rods are pivotally secured to the under side of the body adjacent the rear ends of the rockers. These rods serve the usual purpose of restraining the rolling movement of the body, and prevent said body from slipping on the track members, 10. Each of these rods is provided with downwardly depending arms, 36, being in approximately vertical position when the body is horizontal on the chassis. The lower ends of the arms, 36, are provided with laterally projecting lugs, 37, adapted to engage the under side of the inner track, 16, of each guide member. When the body is in dumping position as in Figure 2, these radius rods, together with their arms, pivoting about their connections to the lower ribs of the guide members, drop to an almost horizontal position, and when the body is rolled back again into load-receiving position the lower sides of the tracks, 16, serve to lock the body to the guide frame against any vertical movement such as bouncing, due to an uneven road bed.

The forward end of the body is suitably supported by a pair of transversely spaced pedestals, 40, attached to the under side of said body. These pedestals co-operate with locking mechanism for maintaining the body in horizontal position. The lower ends of these pedestals are bifurcated fore-and aft, to form grooves, 41, adapted to cooperate and register with upstanding flanges, 42, of bracket members, 43. These brackets are carried on an angle iron 44, extending transversely and attached to the rear end of housings, 45, of the locking mechanism. These bifurcated ends of the pedestals prevent lateral body sway when the vehicle is moving. Said pedestals are provided with forwardly extending brackets, 46, carrying locking pins, 47, projecting laterally for engaging the locking mechanism disposed on opposite sides of the chassis. The housings, 45, of the locking mechanisms are attached to the side members, 2, of the chassis, the forward end by bolts in the usual manner, and the rear end by U-bolts, 48, extending therearound and downwardly through said chassis side members. Each of these housings is so designed as to accommodate a pair of combination cam and gear members, 49. These members comprise gear segments, 50, of slightly more than 90° sections, integral with laterally extending cams, 51. Said cams are provided with annular faces slightly less than the pitch diameter of the gear segments, said faces extending slightly more than 90°, and connected at a point on the gear segments lower than the middle thereof. The upper surfaces of the cams connecting the faces with their hubs are substantially flat and tangent to said hubs to permit free engagement and discharge of the locking pins, 47, with which they co-operate. One of said members is loosely mounted on a stub shaft, 52, supported in the forward part of the housing, co-operating and meshing with a second member keyed on an operating shaft, 53, which extends transversely across and engages the corresponding member of the opposite locking mechanism. Each of the members has an obliquely disposed spring, 54, connected at one end to its lower side and at the other end with the bottom of the housing, 45, so that as the members, 49, are rotated, the springs tend to restore the members to their original position. It will now be clear that as the body is rolled forwardly and downwardly, the locking pins, 47, come in contact with the faces of the respective pairs of cams, 51, whereupon the members, 49, are forced to rotate and permit the cams to separate and allow the pin to pass between them. The pedestals, 40, then engage and rest upon the brackets, 43, for supporting the front end of the body. The partial weight of the front end of the body will be sufficient to force the cams downwardly and apart to permit the pins, 47, to be locked in place. The operating shaft, 53, is provided with an upwardly extending operating lever, 55, which may be rocked forwardly by the driver of the vehicle from the seat, when it is desired to release the locking pins to permit the free movement of the body of the vehicle which will normally tilt rearwardly due to gravity. An arm, 56, is keyed onto the operating shaft adjacent the middle thereof, the outer end being connected to the chain, 33. When the body is in tilted position, the chain becomes fairly taut due to its connection at the forward end with the link member, 30. By again swinging the operating lever forwardly, the arm, 56, will be correspondingly moved, which pulls on chain, 33, sufficiently to cause the link members, 25 and 30, to buckle forwardly and permit the body to be returned to a horizontal position.

The tail gate, 5ª, of the body is hinged at its upper end to the upstanding sides of the body so as to permit the gate to swing clear of the body when the same is tilted to dumping position. The gate is provided with locking mechanism for automatically opening the gate when the body is tilted into dumping position. This mechanism comprises a transversely extending rocking shaft, 60, projecting through the lower angle-irons of the body. A pair of locking hooks, 61, are keyed onto said shaft outside the body, and are adapted to engage the laterally extending lug projections, 62, which are secured on opposite sides of the gate adjacent the bottom. Springs, 63, are connected to said hoods, 61, and extend upwardly, being attached to the end of the body for holding the hook members in engagement with the lugs, 62, to prevent the tail gate from opening. A trip finger, 64, is keyed on the shaft, 60, beneath the body in opposite relation to the hooks, and as the body approaches its limit in tilting, the trip finger, 64, impinges against the spring shackle bracket, 65, at the rear of the chassis, and rocks the shaft, 60, Sufficiently to permit the locking hooks, 61, to release the lug projections, 62, of the tail gate, thereby permitting the gate to swing outwardly away from the body. The ends of the locking hooks are curved to permit the lug projections, 62, to slide thereover in returning to locking engagement when the body is righted. One end of the rocking shaft, 60, preferably on the side of the operating lever, 55, is upturned to provide a handle, 66, for unlocking the tail gate at any position of the body.

I claim:

1. The combination of a vehicle frame, a dumping body, rockers on the body and a track for said rockers on the frame, a radius arm connected to the body near the point of contact of its rockers with the track at the limit of dumping movement and extending toward the other end of said contact to a pivotal connection on the frame together with cooperating stop means associated with said arm and with the frame respectively engageable at the limit of return movement of the body to prevent separation of the rockers from the track.

2. In the combination defined in claim 1, the stop means of the arm being formed on a rigid extension thereof disposed intermediate its ends and engageable with the under side of the track.

3. In combination with a vehicle frame, a dump body with continuously curved rockers secured thereto and track members carried by the frame for rolling engagement by said rockers, said track members each including an initial, downwardly inclined portion and a continuing upwardly inclined portion, the curvature of the rockers and the inclination of the tracks being such that the center of gravity of the body is lowered as the rockers traverse the downwardly inclined tracks and raised as they traverse the upwardly inclined portions, whereby the body is retarded as it approaches the limit of dumping position and tends to return by gravity.

LEROY E. WILLIAMS.